United States Patent [19]
Hradil et al.

[11] 4,067,825
[45] Jan. 10, 1978

[54] METHOD FOR PREPARATION OF AMPHOTERIC ION-EXCHANGERS BY SUBSTITUTION OF HYDROPHILIC POLYMERS

[75] Inventors: Jiri Hradil; Jiri Stamberg; Jiri Coupek, all of Prague, Czechoslovakia

[73] Assignee: Ceskoslovenska akademie ved, Prague, Czechoslovakia

[21] Appl. No.: 689,963

[22] Filed: May 26, 1976

[30] Foreign Application Priority Data

June 5, 1975 Czechoslovakia .................. 3938/75

[51] Int. Cl.$^2$ .................. C08F 8/40; C08L 23/32; C08L 23/34; C08L 23/36
[52] U.S. Cl. .................. 260/2.1 M; 260/2.2 R; 526/16; 526/27
[58] Field of Search .................. 260/2.1 E, 79.5 NV, 260/2.2 R, 2.1 M; 526/41, 49, 30, 50, 27, 16

[56] References Cited
FOREIGN PATENT DOCUMENTS 2,247,739  4/1973  Germany.

*Primary Examiner*—Joseph L. Schofer
*Assistant Examiner*—Peter F. Kulkosky

[57] ABSTRACT

The invention relates to a method for preparation of cationactive and amphoteric ion-exchangers from non-ionogenic crosslinked copolymers containing hydroxyl groups by their reaction with mineral acids, addition products of sulfur trioxide, sulfuric acid or chlorosulfuric acid with alcohols or pyridine, unsaturated compounds, as acrylonitrile, methacrylonitrile or sodium vinylsulfonate in a strongly alkaline medium, or with halogenoalkylammonium compounds. The starting copolymer containing hydroxyl groups is prepared by the suspension copolymerization of monomers, selected from the group which comprises hydroxyalkyl methacrylates and acrylates and oligoglycol acrylates and methacrylates, with crosslinking divinyl monomers, e.g. divinylbenzene, ethylene dimethacrylate, butylenediol dimethacrylate or diacrylate, and advantageously has the macroporous structure. The products are suitable for application in column process thanks to their favorable mechanical properties, namely for chromatographic separation of hydrophilic compounds, e.g. biological materials as aminoacids. The hydrophilicity of the product may be varied by selection of monomers for the starting copolymer, by the type of ionactive substitution and by the degree of transformation.

7 Claims, No Drawings

METHOD FOR PREPARATION OF AMPHOTERIC ION-EXCHANGERS BY SUBSTITUTION OF HYDROPHILIC POLYMERS

The invention relates to a method for performing the chemical reactions whicb allow to transform non-ionogenic crosslinked copolymers based on hydroxyalkyl acrylates or hydroxyalkyl methacrylates into ion-exchangers by substitution of the part of hydroxyl groups present in the polymer by ionactive groups.

Various derivatives of cellulose or dextrans are recently employed for chromatographic separation. However, these derivatives have unsuitable mechanical properties which make difficult their application in column processes (difficult packing, high hydrodynamic resistivity). Fibrous derivatives of cellulose and spherical derivatives of dextrans do not allow the operation under higher pressure because their structure becomes crushed and the columns get clogged.

Cellulose modified by chemical reaction and dextrans also possess unsuitable diffusion properties which cause tailing in chromatographic separations due to more difficult diffusion in the polymer mass in comparison to the diffusion velocity at the polymer surface.

The invention relates to a method for preparation of cationactive and amphoteric hydrophilic ion-exchangers from polymers which contain hydroxyl groups in the structure, wherein the crosslinked copolymers containing hydroxyl groups and being prepared by suspension copolymerization of monomers selected from the group which comprises hydroxyalkyl methacrylates, hydroxyalkyl acrylates, oligoglycol acrylates and oligoglycol methacrylates, with crosslinking divinyl monomers, e.g. divinylbenzene, ethylene dimethacrylate, butylenediol, dimethacrylate and butylenediol diacrylate, and modified by treatment with mineral acids or addition products of sulfur trioxide or sulfuric acid with alcohols, by the reaction with unsaturated compounds, as acrylonitrile, methacrylonitrile, sodium vinyl-sulfonate in a strongly alkaline medium, or by the reaction with halogenoalkylammonium compounds.

The cationactive ion-exchanger may be prepared by the method according to the invention by esterification of the polymer with mineral acids or their addition compounds (80 – 100% sulfuric acid, metaphosphoric acid - $HPO_3$, addition compounds of chlorosulfuric acid and pyridine, sulfur trioxide or sulfuric acid with alcohols, e.g. isopropyl alcohol) or by the reaction of the polymer hydroxyl group with unsaturated compounds (acrylonitrile, methacrylonitrile, sodium vinylsulfonate) in a strongly alkaline medium (25 – 50% sodium or potassium hydroxide).

Esters of the aforesaid polymers may be prepared by the method according to this invention by action of metaphosphoric acid ($HPO_3$) in contradiction to orthophosphoric acid ($H_3PO_4$) or phosphorus pentoxide ($P_2O_5$) used in the Czechoslovak Patent Application PV 6008-73.) The resulting product is uniform and no chlorination of polymer proceeds, unlike the case of phosphoric acid chlorides ($PCl_5$, $POCl_3$), used in the Czechoslovak Patent Application PV 6008-73.

Sulfoesters of the aforesaid polymers may be most advantageously prepared according to this invention by action of 90 – 100% sulfuric acid or addition compounds of sulfuric acid or sulfur trioxicde with alcohol (e.g. isopropyl alcohol) or chlorosulfuric acid with pyridine. Chlorosulfuric acid alone, as it was proposed in the Czechoslovak Patent Application PV 704-74, acts rather energetically and, consequently, undesirable side reactions occur (oxidation and chlorination of the polymer). Acidic groups introduced by esterification with mineral acids are entirely stable in an alkaline medium, which does not cause hydrolysis of the polymeric skeleton containing ester groups at the ambient temperature. These esters of mineral acids are less stable in an acidic medium, however, this instability is not of the type which should make their application impossible.

The method according to the invention further enables to prepare poly(sulfoethoxyalkyl esters) by treatment of the aforesaid polymers with sodium vinylsulfonate or vinylsulfonic acid. Sodium vinylsulfonate is the true reagent in the addition to hydroxylic group in a strongly alkaline medium and it can be also prepared directly in the reaction mixture by dissolution of sodium 2-chloroethylsulfonate in 25 – 50% hydroxide in the presence of the aforesaid polymers or the reaction can be carried out after the supplemental addition of the swollen polymer.

The method according to the invention enables to perform the addition reaction of hydroxyl groups of the polymer with vinyl groups of acrylonitrile or methacrylonitrile in a strongly alkaline medium. The cation-exchanger with weakly acidic groups is obtained by the subsequent hydrolysis of nitrile groups in an alkaline medium at the enhanced temperature.

An amphoteric ion-exchanger may be also prepared by the method according to this invention by treatment with 2-chloroethyldiethylammonium hydrochloride in the medium of 25 – 50% hydroxide for 20 – 120 minutes at the temperature 80° – 130° C in the single step, in contradiction to the Czechoslovak Patent Application Pv 978-74, where carboxylic groups were introduced in the further step by reaction with chloroacetic acid. According to the present invention, carboxylic groups are formed in the parallel alkaline hydrolysis of the polymeric skeleton of ester type and they have, consequently, the structure different from the ion-exchanger prepared according to the Czechoslovak Patent Application PV 978-74.

The polymer employed in the transformation are namely the synthetic polymer of hydroxyalkyl methacrylates or acrylates, where alkyl has 1 to 18 carbon atoms, oligoglycol methacrylates or acrylates, and poly(ethylene glycol) methacrylates or acrylates which are crosslinked with the divinyl monomer, e.g. divinylbenzene, ethylene dimethacrylate, and advantageously with butylenediol dimethacrylate or acrylate which, in contradiction to other crosslinking agents, increases the content of reactive groups in the polymer.

In the transformation, the said copolymers may be used as beads which advantgeously have the macroporous structure. This kind of polymer have the more advantageous ratio of surface area to the total mass.

Ionactive groups introduced into such polymer are therefore present predominantly in the surface layer or in the layer not deeply under the surface (below 0.5 $\mu m$). This fact considerably improves diffusion conditions of the ion-exchanger, so that it does not exhibit tailing of chromatographic peaks in the chromatographic separation and, consequently, it has the higher separation efficiency. the macroporous structure of the polymer, i.e. the structure of permanent porosity manifested by high values of specific surface are (as high as 500 $m^2/g$) also in the non-swollen state, enables to introduce the majority of exchanging groups into the surface layer of polymer to exclude the diffusion through the polymer mass in this way.

The given types of starting copolymers are hydrophilic, similarly as cellulose or dextran gels, and their hydrophility is further increased by the chemical transformation introducing the ion-exchanging groups. This is very important for separation of biological materials of the hydrophilic character, an aminoacids and the like. The hydrophilic character can be varied not only by selection of monomers in the synthesis of the starting copolymer, but also by the kind of the introduced ionactive substituent and by the degree of transformation.

The novelty of the objective of this invention consists above all in application of the poly(hydroxyalkyl methacrylate) type of polymer or other aforesaid polymers for reactions with reagents which have not been used as far for the purpose of introduction of ionactive groups into the polymer (metaphosphoric acid, sulfuric acid, addition compounds of sulfuric acid, sulfur trioxide and chlorosulfuric acid, sodium ethylenesulfonate, and the like.

The examples which illustrate the objective of the invention follow without limiting the scope of the invention to them by any means.

EXAMPLE 1

Metaphosphoric acid (162.6 parts) was cooled down to 0° C and then 60 ml of isopropyl alcohol was dropwise added. After mixing of the alcohol and acid, 5 parts of the macroporous copolymer was added which consisted of 39 wt.% of 2-hydroxyethyl methacrylate and 61 wt.% of ethylene dimethacrylate and had the specific surface area 77.7 m$^2$/g. The product obtained after 40 hours of occasional stirring at the ambient temperature had the exchange capacity 0.34 miliequivalent/g$_s$. Logarithm of the apparent dissociation constant determined from the titration curve in 0.5 N NaCl was pK = 3.25.

EXAMPLE 2

To metaphosphoric acid in isopropyl alcohol prepared as in Example 1, 5 parts of the macroporous copolymer was added, which consisted of 90 wt.% of 2-hydroxyethyl methacrylate and 10 wt.% of ethylene dimethacrylate. The product obtained after 10 hours of heating to 50° C under occasional stirring has the exchange capacity 1 miliequivalent/g$_s$.

EXAMPLE 3

Chlorosulfuric acid (11.6 parts) was dropwise added to 60 parts of pyridine under cooling to −10° C and then 5 parts of the macroporous copolymer was added which consisted of 39 wt.% of 2-hydroxyethyl methacrylate and 61 wt.% of ethylene dimethacrylate. The temperature was then raised to 40° C and the reaction mixture was poured in ice after 4 hours of heating. The exchange capacity of the resulting cationactive polymer was 3.60 miliequivlent/g$_s$ (according to the salt exchange), the swelling was 2.7 g H$_2$O/g$_s$, and pK' in 0.5 N NaCl was 2.7.

EXAMPLE 4

The macroporous copolymer as in Example 3 (5 parts) was dispersed in 30 parts of concentrated sulfuric acid. After 30 minutes keeping at the ambient temperature, the product was filtered on a fritted-glass filter, washed with 1 N NaCl and used for several determinations of capacity of this sulfoester ion-exchanging derivative. The exchange capacity according to the salt exchange was 2.22 miliequivalent/g$_s$, the swelling was 2.34 g H$_2$O/g$_s$, and pK' in 0.5 N NaCl was 2.7.

EXAMPLE 5

The macroporous copolymer consisting of 50 wt.% of 2-hydroxyethyl methacrylate and 50 wt.% of ethylene dimethacrylate (5 parts) was dispersed in 50 ml of 92 % sulfuric acid and the product was worked out after 1 hour as in Example 4. The exchange capacity was 2.6 miliequivalents/g$_s$.

EXAMPLE 6

The macroporous copolymer as in Example 1 (5 parts) was swelled in 20 parts of NaOH solution (15 parts of NaOH in 10 parts of water). 25 parts of 25% solution of sodium vinylsulfonate was then added and the mixture was heated to 40° C for 4 hours. The exchange capacity of the isolated product was 0.8 miliequivalent/g$_s$.

EXAMPLE 7

The macroporous copolymer (5 parts) was swelled for 30 minutes at the ambient temperature in 25 parts of NaOH solution which consisted of 5.86 parts of NaOH and 19.14 parts of water. One part of 2-chloroethyldiethylammonium hydrochloride in 1 part of water was then added and the mixture was heated to 85° C for 2 hours. The resulting polymer contained, according to the total exchange capacity and an argentometric determination of chlorides after exchange, 0.30 miliequivalent/g$_s$ of basic groups (pK' = 9.5) and 0.20 miliequivalent/g$_s$ of weakly acidic groups (pK' = 4.5).

EXAMPLE 8

The macroporous copolymer according to Example 1 (5 parts) was swelled for 10 minutes in 25 parts of NaOH solution which was prepared by dissolution of 8.75 parts of NaOH in 12.25 parts of water. After addition of 3 parts of acrylonitrile, the mixture was heated to 80° C for 2 hours. The product had the exchange capacity 1.3 miliequivalents/g$_s$.

EXAMPLE 9

The macroporous poly(2-hydroxyethyl methacrylate -co- ethylene dimethacrylate) (5 parts) was sulfonated and worked out as in Example 4. The product had the exchange capacity 4.5 miliequivalents/g$_s$.

We claim:

1. A method for preparation of cationactive ion-exchangers from macroporous hydrophilic polymers containing crosslinked copolymers having hydroxyl groups in their structure, said crosslinked copolymers being prepared by suspension copolymerization of monomers selected from the group consisting by hydroxyalkyl methacrylates, hydroxyalkyl acrylates, oligoglycol acrylates and oligoglycol methacrylates, with crosslinking divinyl monomers selected from the group consisting of divinylbenzene, ethylene dimethacrylate, butylenediol diacrylate, said copolymers being modified by treatment with a material selected from the group consisting of sulfuric acid, chlorosulfuric acid - pyridine complex and metaphosphoric acid - alcohol complexes at a temperature of 20° – 50° C. for 0.4 – 40 hours.

2. Method for preparation as set forth in claim 1, wherein the copolymer containing hydroxyl groups is modified by treatment with sulfuric acid of concentration 90 – 100% for 5 – 60 minutes.

3. A method as set forth in claim 1, wherein the copolymer containing hydroxyl groups is treated with pyridinium sulfate at the temperature 35° – 50° C for 2 – 10 hours.

4. A method as set forth in claim 1, wherein the copolymer is treated with the addition compound of sulfur trioxide or chlorosulfuric acid with isopropyl alcohol for 5 – 120 minutes.

5. A method as set forth in claim 1, wherein the hydroxyl groups of copolymers are modified by treatment with metaphosphoric acid ($HPO_3$) for 40 hours at the temperature 25° – 50° C.

6. A method as set forth in claim 1, wherein the copolymer containing hydroxyl groups is treated with pyridinium chlorosulfate.

7. A method as set forth in claim 1, wherein the copolymer containing hydroxyl groups is treated with a metaphosphoric acid-alcohol complex for up to 40 hours.

* * * * *